US012515313B2

(12) United States Patent
Mozes et al.

(10) Patent No.: US 12,515,313 B2
(45) Date of Patent: Jan. 6, 2026

(54) ROBOT SYSTEM AND RELATED METHODS OF OPERATING AND FORMING A ROBOT SYSTEM

(71) Applicant: NEOCIS INC., Miami, FL (US)

(72) Inventors: Alon Mozes, Miami Beach, FL (US); Ajay Gopal Royan, Austin, TX (US); Robert Mittendorff, Palo Alto, CA (US); Dennis Moses, Hollywood, FL (US); Erik Paul Flor Beuckelaers, San Diego, CA (US)

(73) Assignee: NEOCIS INC., Miami, FL (US)

( * ) Notice: Subject to any disclaimer, the term of this patent is extended or adjusted under 35 U.S.C. 154(b) by 7 days.

(21) Appl. No.: 18/706,236

(22) PCT Filed: Nov. 7, 2022

(86) PCT No.: PCT/IB2022/060702
§ 371 (c)(1),
(2) Date: Apr. 30, 2024

(87) PCT Pub. No.: WO2023/079530
PCT Pub. Date: May 11, 2023

(65) Prior Publication Data
US 2025/0001589 A1    Jan. 2, 2025

Related U.S. Application Data

(60) Provisional application No. 63/276,986, filed on Nov. 8, 2021.

(51) Int. Cl.
*B25J 9/00* (2006.01)
*A61B 34/32* (2016.01)
*B25J 13/08* (2006.01)

(52) U.S. Cl.
CPC ............. *B25J 9/0087* (2013.01); *A61B 34/32* (2016.02); *B25J 13/089* (2013.01)

(58) Field of Classification Search
CPC ....... B25J 9/0087; B25J 13/089; A61B 34/32; A61B 34/10; A61B 34/74;
(Continued)

(56) References Cited

U.S. PATENT DOCUMENTS 11,045,267 B2 * 6/2021 Hussain ................. A61B 34/32
12,257,124 B1 * 3/2025 Patel ..................... A61B 34/30
(Continued)

FOREIGN PATENT DOCUMENTS

CN      110772320 A    2/2020
CN      210790955 U    6/2020
(Continued)

*Primary Examiner* — Kira Nguyen
(74) *Attorney, Agent, or Firm* — Womble Bond Dickinson (US) LLP (57) ABSTRACT

A robot system includes a tracking arm in communication with a reference location about a site. A robot arm has a procedure tool/end effector engaged therewith, and a proximal end disposed in a known relation to a proximal end of the tracking arm. A controller determines an actual spatial relation between the procedure tool and the reference location in a three-dimensional space via the robot and tracking arms, and directs the procedure tool to a staging position adjacent to the site by regulating movement of the robot arm according to an operational plan and based on the actual spatial relation. An actuator is spaced-apart from the procedure tool and in communication with the controller. The actuator actuates the controller to direct the robot arm to autonomously move the procedure tool from the staging position, according to the operational plan, to interact with the site and perform the procedure.

30 Claims, 6 Drawing Sheets

(58) Field of Classification Search
CPC .... A61B 2034/2046; A61B 2034/2059; A61B 2034/304; A61B 34/30; A61C 1/084
USPC ........................................................ 700/253
See application file for complete search history.

(56) References Cited

U.S. PATENT DOCUMENTS

| | | | |
|---|---|---|---|
| 2015/0057675 A1* | 2/2015 | Akeel .................... | G16H 50/50 |
| | | | 901/47 |
| 2016/0354169 A1 | 12/2016 | Suttin et al. | |
| 2018/0221098 A1* | 8/2018 | Forsyth ................. | A61B 5/064 |
| 2018/0256259 A1* | 9/2018 | Crawford ........... | A61B 17/7082 |
| 2019/0239969 A1 | 8/2019 | Abu-Akeel et al. | |
| 2020/0054421 A1 | 2/2020 | Mozes | |
| 2020/0315754 A1 | 10/2020 | Ciriello et al. | |
| 2020/0323540 A1 | 10/2020 | Kang et al. | |
| 2024/0366321 A1* | 11/2024 | Ciriello ................. | A61C 1/082 |

FOREIGN PATENT DOCUMENTS

| | | |
|---|---|---|
| JP | 2017023339 A | 2/2017 |
| WO | 2009044287 A2 | 4/2009 |

\* cited by examiner

ROBOT SYSTEM AND RELATED METHODS OF OPERATING AND FORMING A ROBOT SYSTEM

CROSS-REFERENCE TO RELATED APPLICATIONS

This application is a national stage filing under 35 U.S.C. 371 of PCT/IB2022/060702, filed Nov. 7, 2022, which International Application was published by the International Bureau in English on May 11, 2023, as WO 2023/079530, and application claims priority from U.S. Application No. 63/276,986, filed on Nov. 8, 2021, which applications are hereby incorporated in their entirety by reference in this application.

BACKGROUND

Field of the Disclosure

The present application relates to robot systems and, more particularly, to a robot system having a remotely-actuated autonomous mode, and methods of operating and forming such a robot system.

Description of Related Art

Illnesses are commonly shared in the workplace, but the risk of exposure may be significantly higher for dental professionals using powered instrumentation such as ultrasonics, air polishers, and drills. Bacteria and viruses can spread rapidly through splatter, aerosols, and particulate debris produced by these types of treatments. That is, aerosols, particulate debris, and splatter produced, for example, by ultrasonic, drilling, and air polishing treatments can contain saliva, blood, bacteria, and pathogens. Once airborne, aerosol particles can linger in the environment for an hour or more while particulate debris and splatter can end up on the surfaces immediately surrounding the treatment area. This poses a risk, for example, for the spread of the common cold and influenza viruses, herpes viruses, pathogenic streptococci or staphylococci, severe acute respiratory syndrome (SARS), and tuberculosis (TB), with primary risk to the dental professional.

Moreover, in conducting dental procedures using such powered instrumentation, the patient is often in a reclined position, and the dental professional must contort and get close to the patient's mouth, or maneuver a small handheld mirror, in order to be able to view the procedure as it is being conducted. This is the case in instances where the procedure is conducted with the instrumentation engaged with a guided robotic system. Accordingly, such dental procedures can often be cumbersome, non-user-friendly, and non-ergonomic for the dental professional, and may increase the risk of exposure of the dental professional to hazardous aerosols and particulate matter resulting from the procedure.

Thus, there exists a need for a robot system, in some instances a dental robotic system, for facilitating effective regulation of the spread of contagions and contaminants, particularly to the dental professional, by limiting the exposure of the dental professional to aerosols and particulate debris resulting from a dental/maxillofacial procedure. There also exists a need for a robot system that would allow the dental professional to conduct a dental/maxillofacial procedure in a user-friendly, distanced, and ergonomic manner. Such a robot system should preferably be effective without limiting the mobility of the dental tool or the accessibility of the dental tool to the dental/maxillofacial structure, while allowing the dental professional to conduct the dental/maxillofacial structure without having to be too close to the actual interaction between the dental tool and the dental/maxillofacial structure.

SUMMARY OF THE DISCLOSURE

The above and other needs are met by aspects of the present disclosure which, in one particular aspect, provides a robot system, comprising a tracking arm having a distal end arranged in communication with a reference location at or adjacent to a site or an object received at the site, wherein the reference location is disposed in a relation to a proximal end of the tracking arm in a three-dimensional space. A robot arm has a procedure tool engaged with a distal end thereof, wherein the procedure tool has an end effector engaged therewith, the end effector has a distal end adapted to interact with the site or the object, and the robot arm has a proximal end disposed in a known relation to the proximal end of the tracking arm. A controller includes a processor and memory, wherein the controller is arranged in operable communication with the tracking arm, the robot arm, and the procedure tool. The controller is arranged to determine an actual spatial relation between the procedure tool and the reference location in the three-dimensional space via the robot arm and the tracking arm, wherein the actual spatial relation includes a location of the distal end of the end effector of the procedure tool in relation to the reference location. The controller is further arranged to direct the procedure tool to a staging position adjacent to the site or the object by regulating movement of the robot arm according to an operational plan and based on the actual spatial relation. The operational plan includes a route traversed by the end effector to and from the site or the object and during the procedure performed by the end effector at the site or on the object. An actuator is disposed in spaced-apart relation to the procedure tool and arranged in communication with the controller. The actuator is arranged to actuate the controller to direct the robot arm to autonomously move the procedure tool from the staging position and according to the operational plan, for the end effector to interact with the site or the object and for the procedure tool to perform the procedure at the site or on the object using the end effector, relative to the reference location.

Another aspect of the present disclosure provides a method of operating a robot system, wherein such a method comprises arranging a distal end of a tracking arm in communication with a reference location at or adjacent to a site or an object received at the site, with the reference location being disposed in a relation to a proximal end of the tracking arm in a three-dimensional space. A procedure tool is arranged in engagement with a distal end of a robot arm, wherein the procedure tool has an end effector engaged therewith, the end effector has a distal end adapted to interact with the site or the object, and the robot arm has a proximal end disposed in a known relation to the proximal end of the tracking arm. Using a controller including a processor and memory, and arranged in operable communication with the tracking arm, the robot arm, and the procedure tool, an actual spatial relation is determined between the procedure tool and the reference location in the three-dimensional space via the robot arm and the tracking arm, wherein the actual spatial relation includes a location of the distal end of the end effector of the procedure tool in relation to the reference location. The procedure tool is directed to a staging position adjacent to the site or the object by regulating movement of the robot arm, using the controller device, according to an operational plan and based on the actual spatial relation. The operational plan includes a route traversed by the end effector to and from the site or the object and during the procedure performed by the end effector at the site or on the object. An actuator arranged in spaced-apart relation to the procedure tool and in communication with the controller, is actuated to actuate the controller to direct the robot arm to autonomously move the procedure tool from the staging position and according to the operational plan, for the end effector to interact with the site or the object and for the procedure tool to perform the procedure at the site or on the object using the end effector, relative to the reference location.

Yet another aspect of the present disclosure provides a method of forming a robot system, wherein such a method comprises arranging a robot arm such that a proximal end thereof is disposed in a known relation with a proximal end of a tracking arm, wherein the tracking arm has a distal end adapted to be in communication with a reference location at or adjacent to a site or an object received at the site, with the reference location being disposed in a relation to a proximal end of the tracking arm in a three-dimensional space. A procedure tool is engaged with a distal end of the robot arm, wherein the procedure tool has an end effector engaged therewith, and the end effector has a distal end adapted to interact with the site or the object. A controller, the controller including a processor and a memory, is arranged in operable communication with the tracking arm, the robot arm, and the procedure tool. The controller is arranged to determine an actual spatial relation between the procedure tool and the reference location in the three-dimensional space via the robot arm and the tracking arm, wherein the actual spatial relation includes a location of the distal end of the end effector of the procedure tool in relation to the reference location. The procedure tool is directed to a staging position adjacent to the site or the object by regulating movement of the robot arm according to an operational plan and based on the actual spatial relation. The operational plan includes a route traversed by the end effector to and from the site or the object and during the procedure performed by the end effector at the site or on the object. An actuator is arranged in spaced-apart relation to the procedure tool and in communication with the controller, such that the actuator is arranged to actuate the controller to direct the robot arm to autonomously move the procedure tool from the staging position, according to the operational plan, for the end effector to interact with the site or the object and for the procedure tool to perform the procedure at the site or on the object using the end effector, relative to the reference location.

The present disclosure thus includes, without limitation, the following example embodiments:

Example Embodiment 1: A robot system, comprising a tracking arm having a distal end arranged in communication with a reference location at or adjacent to a site or an object received at the site, the reference location being disposed in a relation to a proximal end of the tracking arm in a three-dimensional space; a robot arm having a procedure tool engaged with a distal end thereof, the procedure tool having an end effector engaged therewith, the end effector having a distal end adapted to interact with the site or the object, the robot arm having a proximal end disposed in a known relation to the proximal end of the tracking arm; a controller including a processor and memory, the controller being arranged in operable communication with the tracking arm, the robot arm, and the procedure tool, the controller being arranged to determine an actual spatial relation between the procedure tool and the reference location in the three-dimensional space via the robot arm and the tracking arm, the actual spatial relation including a location of the distal end of the end effector of the procedure tool in relation to the reference location; and direct the procedure tool to a staging position adjacent to the site or the object by regulating movement of the robot arm according to an operational plan and based on the actual spatial relation, the operational plan including a route traversed by the end effector to and from the site or the object and during the procedure performed by the end effector at the site or on the object; and an actuator disposed in spaced-apart relation to the procedure tool and arranged in communication with the controller, the actuator being arranged to actuate the controller to direct the robot arm to autonomously move the procedure tool from the staging position and according to the operational plan, for the end effector to interact with the site or the object and for the procedure tool to perform the procedure at the site or on the object using the end effector, relative to the reference location.

Example Embodiment 2: The system of any preceding example embodiment, or combinations thereof, wherein the controller is spaced-apart from the procedure tool and the controller includes the actuator.

Example Embodiment 3: The system of any preceding example embodiment, or combinations thereof, wherein the actuator is discrete and separate from the controller.

Example Embodiment 4: The system of any preceding example embodiment, or combinations thereof, wherein the actuator is separated from the procedure tool by a barrier therebetween.

Example Embodiment 5: The system of any preceding example embodiment, or combinations thereof, wherein the controller is arranged to direct the robot arm to autonomously move the procedure tool back to the staging position or to a retracted position spaced-apart from the site or the object, on completion of the procedure on the site or the object or in response to the actuator actuating the controller to retract the procedure tool to the retracted position.

Example Embodiment 6: The system of any preceding example embodiment, or combinations thereof, wherein the controller is arranged to change the actual spatial relation between the procedure tool and the reference location, relative to movement of the reference location, with the procedure tool in the staging position.

Example Embodiment 7: The system of any preceding example embodiment, or combinations thereof, wherein the controller is arranged to change the actual spatial relation between the procedure tool and the reference location, relative to movement of the reference location, upon the robot arm being directed by the controller to autonomously move the procedure tool from the staging position, according to the operational plan, for the end effector to interact with the site or the object or for the procedure tool to perform the procedure at the site or on the object using the end effector.

Example Embodiment 8: The system of any preceding example embodiment, or combinations thereof, comprising a drive unit in communication with the controller, and operably engaged with the robot arm, operably engaged between the robot arm and the procedure tool, or operably engaged with the procedure tool, the drive unit being responsive to actuation of the actuator, via the controller, to cooperate with the robot arm to autonomously move the procedure tool from the staging position, according to the operational plan, for the end effector to interact with the site or the object and for the procedure tool to perform the procedure at the site or on the object using the end effector.

Example Embodiment 9: The system of any preceding example embodiment, or combinations thereof, wherein the robot arm comprises a plurality of interconnected arm segments having one or more position sensors engaged therewith, and wherein the controller is arranged to determine the location of the distal end of the end effector of the procedure tool, in relation to the proximal end of the robot arm, from position data from the one or more position sensors.

Example Embodiment 10: The system of any preceding example embodiment, or combinations thereof, wherein the tracking arm comprises a plurality of interconnected arm segments having one or more position sensors engaged therewith, and wherein the controller is arranged to determine a location of the distal end of the tracking arm, relative to the proximal end thereof, from position data from the one or more position sensors.

Example Embodiment 11: A method of operating a robot system, the method comprising arranging a distal end of a tracking arm in communication with a reference location at or adjacent to a site or an object received at the site, the reference location being disposed in a relation to a proximal end of the tracking arm in a three-dimensional space; arranging a procedure tool in engagement with a distal end of a robot arm, the procedure tool having an end effector engaged therewith, the end effector having a distal end adapted to interact with the site or the object, and the robot arm having a proximal end disposed in a known relation to the proximal end of the tracking arm; determining, using a controller including a processor and memory, and arranged in operable communication with the tracking arm, the robot arm, and the procedure tool, an actual spatial relation between the procedure tool and the reference location in the three-dimensional space via the robot arm and the tracking arm, the actual spatial relation including a location of the distal end of the end effector of the procedure tool in relation to the reference location; directing the procedure tool to a staging position adjacent to the site or the object by regulating movement of the robot arm, using the controller device, according to an operational plan and based on the actual spatial relation, the operational plan including a route traversed by the end effector to and from the site or the object and during the procedure performed by the end effector at the site or on the object; and actuating an actuator arranged in spaced-apart relation to the procedure tool and in communication with the controller, to actuate the controller to direct the robot arm to autonomously move the procedure tool from the staging position and according to the operational plan, for the end effector to interact with the site or the object and for the procedure tool to perform the procedure at the site or on the object using the end effector, relative to the reference location.

Example Embodiment 12: The method of any preceding example embodiment, or combinations thereof, wherein actuating the actuator comprises actuating the actuator included in the controller, with the controller being spaced-apart from the procedure tool.

Example Embodiment 13: The method of any preceding example embodiment, or combinations thereof, wherein actuating the actuator comprises actuating the actuator with the actuator being discrete and separate from the controller.

Example Embodiment 14: The method of any preceding example embodiment, or combinations thereof, wherein actuating the actuator comprises actuating the actuator with the actuator being separated from the procedure tool by a barrier therebetween.

Example Embodiment 15: The method of any preceding example embodiment, or combinations thereof, comprising directing, by the controller, the robot arm to autonomously move the procedure tool back to the staging position or to a retracted position spaced-apart from the site or the object, on completion of the procedure on the site or the object or in response to the actuator actuating the controller to retract the procedure tool to the retracted position.

Example Embodiment 16: The method of any preceding example embodiment, or combinations thereof, comprising changing, by the controller, the actual spatial relation between the procedure tool and the reference location, relative to movement of the reference location, with the procedure tool in the staging position.

Example Embodiment 17: The method of any preceding example embodiment, or combinations thereof, comprising changing, by the controller, the actual spatial relation between the procedure tool and the reference location, relative to movement of the reference location, upon the robot arm being directed by the controller to autonomously move the procedure tool from the staging position, according to the operational plan, for the end effector to interact with the site or the object or for the procedure tool to perform the procedure at the site or on the object using the end effector.

Example Embodiment 18: The method of any preceding example embodiment, or combinations thereof, wherein actuating the actuator comprises actuating the actuator to actuate a drive unit, the drive unit being in communication with the controller, and operably engaged with the robot arm, operably engaged between the robot arm and the procedure tool, or operably engaged with the procedure tool, the drive unit being responsive to actuation of the actuator, via the controller, to cooperate with the robot arm to autonomously move the instrument from the staging position, according to the operational plan, for the end effector to interact with the site or the object and for the procedure tool to perform the procedure at the site or on the object using the end effector.

Example Embodiment 19: The method of any preceding example embodiment, or combinations thereof, wherein the robot arm comprises a plurality of interconnected arm segments having one or more position sensors engaged therewith, and wherein determining the actual spatial relation comprises determining, using the controller, the location of the distal end of the end effector of the procedure tool, in relation to the proximal end of the robot arm, from position data from the one or more position sensors.

Example Embodiment 20: The method of any preceding example embodiment, or combinations thereof, wherein the tracking arm comprises a plurality of interconnected arm segments having one or more position sensors engaged therewith, and wherein determining the actual spatial relation comprises determining, using the controller, a location of the distal end of the tracking arm, relative to the proximal end thereof, from position data from the one or more position sensors.

Example Embodiment 21: A method of forming a robot system, comprising arranging a robot arm such that a proximal end thereof is disposed in a known relation with a proximal end of a tracking arm, the tracking arm having a distal end adapted to be in communication with a reference location at or adjacent to a site or an object received at the site, with the reference location being disposed in a relation to a proximal end of the tracking arm in a three-dimensional space; engaging a procedure tool with a distal end of the robot arm, the procedure tool having an end effector engaged therewith, the end effector having a distal end adapted to interact with the site or the object; arranging a controller, the controller including a processor and a memory, in operable communication with the tracking arm, the robot arm, and the procedure tool, the controller being arranged to determine an actual spatial relation between the procedure tool and the reference location in the three-dimensional space via the robot arm and the tracking arm, the actual spatial relation including a location of the distal end of the end effector of the procedure tool in relation to the reference location; direct the procedure tool to a staging position adjacent to the site or the object by regulating movement of the robot arm according to an operational plan and based on the actual spatial relation, the operational plan including a route traversed by the end effector to and from the site or the object and during the procedure performed by the end effector at the site or on the object; and arranging an actuator in spaced-apart relation to the procedure tool and in communication with the controller, such that the actuator is arranged to actuate the controller to direct the robot arm to autonomously move the procedure tool from the staging position, according to the operational plan, for the end effector to interact with the site or the object and for the procedure tool to perform the procedure at the site or on the object using the end effector, relative to the reference location.

Example Embodiment 22: The method of any preceding example embodiment, or combinations thereof, wherein arranging the actuator comprises arranging the actuator to be included in the controller, and arranging the controller to be spaced-apart from the procedure tool.

Example Embodiment 23: The method of any preceding example embodiment, or combinations thereof, wherein arranging the actuator comprises arranging the actuator such that the actuator is discrete and separate from the controller.

Example Embodiment 24: The method of any preceding example embodiment, or combinations thereof, wherein arranging the actuator comprises arranging the actuator such that the actuator is separated from the procedure tool by a barrier therebetween.

Example Embodiment 25: The method of any preceding example embodiment, or combinations thereof, wherein arranging the controller comprises arranging the controller to direct the robot arm to autonomously move the procedure tool back to the staging position or to a retracted position spaced-apart from the site or the object, on completion of the procedure on the site or the object or in response to the actuator actuating the controller to retract the procedure tool to the retracted position.

Example Embodiment 26: The method of any preceding example embodiment, or combinations thereof, wherein arranging the controller comprises arranging the controller to change the actual spatial relation between the procedure tool and the reference location, relative to movement of the reference location, with the procedure tool in the staging position.

Example Embodiment 27: The method of any preceding example embodiment, or combinations thereof, wherein arranging the controller comprises arranging the controller to change the actual spatial relation between the procedure tool and the reference location, relative to movement of the reference location, upon the robot arm being directed by the controller to autonomously move the procedure tool from the staging position, according to the operational plan, for the end effector to interact with the site or the object or for the procedure tool to perform the procedure at the site or on the object using the end effector.

Example Embodiment 28: The method of any preceding example embodiment, or combinations thereof, wherein arranging the actuator comprises arranging the actuator to actuate a drive unit, the drive unit being in communication with the controller, and operably engaged with the robot arm, operably engaged between the robot arm and the procedure tool, or operably engaged with the procedure tool, the drive unit being arranged to be responsive to actuation of the actuator, via the controller, to cooperate with the robot arm to autonomously move the instrument from the staging position, according to the operational plan, for the end effector to interact with the site or the object and for the procedure tool to perform the procedure at the site or on the object using the end effector.

Example Embodiment 29: The method of any preceding example embodiment, or combinations thereof, wherein the robot arm comprises a plurality of interconnected arm segments having one or more position sensors engaged therewith, and wherein arranging the controller comprises arranging the controller to determine the location of the distal end of the end effector of the procedure tool, in relation to the proximal end of the robot arm, from position data from the one or more position sensors.

Example Embodiment 30: The method of any preceding example embodiment, or combinations thereof, wherein the tracking arm comprises a plurality of interconnected arm segments having one or more position sensors engaged therewith, and wherein arranging the controller comprises arranging the controller to determine a location of the distal end of the tracking arm, relative to the proximal end thereof, from position data from the one or more position sensors.

These and other features, aspects, and advantages of the present disclosure will be apparent from a reading of the following detailed description together with the accompanying drawings, which are briefly described below. The present disclosure includes any combination of two, three, four, or more features or elements set forth in this disclosure, regardless of whether such features or elements are expressly combined or otherwise recited in a specific embodiment description herein. This disclosure is intended to be read holistically such that any separable features or elements of the disclosure, in any of its aspects and embodiments, should be viewed as intended, namely to be combinable, unless the context of the disclosure clearly dictates otherwise.

It will be appreciated that the summary herein is provided merely for purposes of summarizing some example aspects so as to provide a basic understanding of the disclosure. As such, it will be appreciated that the above described example aspects are merely examples and should not be construed to narrow the scope or spirit of the disclosure in any way. It will be appreciated that the scope of the disclosure encompasses many potential aspects, some of which will be further described below, in addition to those herein summarized. Further, other aspects and advantages of such aspects disclosed herein will become apparent from the following detailed description taken in conjunction with the accompanying drawings which illustrate, by way of example, the principles of the described aspects.

BRIEF DESCRIPTION OF THE SEVERAL VIEWS OF THE DRAWING(S)

Having thus described the disclosure in general terms, reference will now be made to the accompanying drawings, which are not necessarily drawn to scale, and wherein:

DETAILED DESCRIPTION OF THE DISCLOSURE

The present disclosure now will be described more fully hereinafter with reference to the accompanying drawings, in which some, but not all aspects of the disclosure are shown. Indeed, the disclosure may be embodied in many different forms and should not be construed as limited to the aspects set forth herein; rather, these aspects are provided so that this disclosure will satisfy applicable legal requirements. Like numbers refer to like elements throughout.

Figure 1:
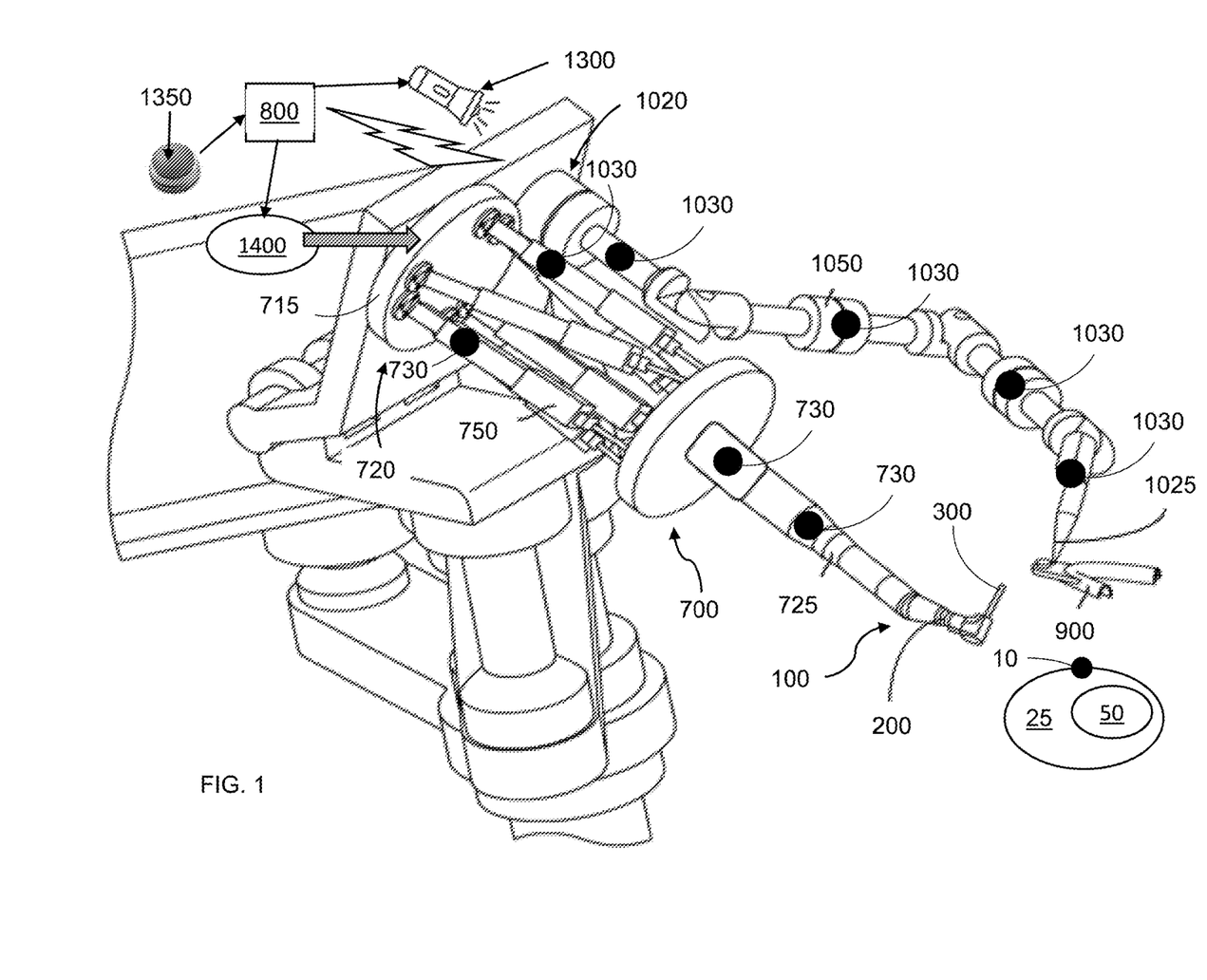
FIGS. 1 and 2 schematically illustrate alternate aspects of a robot system implemented by method aspects of the present disclosure.

FIG. 1 schematically illustrates a robot system 100 according to one aspect of the present disclosure. Such a system includes a procedure tool 200 having an end effector 300 adapted to interact with a site 25, or an object 50 received at the site 25. The site 25 can be a maxillofacial structure or a dental structure, and the object 50 can be a tooth, a dental implant/crown, or the like.

While aspects of the present disclosure include examples relating the robot system to maxillofacial/dental anatomy or maxillofacial structure, a person of ordinary skill in the art will appreciate that reference to the maxillofacial/dental anatomy or maxillofacial/dental structure, in some aspects, is merely to provide the example of an object interacted with/by the disclosed procedure tool/end effector and/or robot system. Otherwise, reference herein to an "object" is directed and expressly refers to non-human objects. In some examples, such non-human objects are maxillofacial/dental anatomy models or maxillofacial/dental structure models or other non-human representations or reproductions of such anatomy or structure. The disclosed systems and methods herein are implemented to provide, for example, a convenient and effective training tool or training provision for the dental professional to develop their skills in regard to the procedures and tools described herein. Moreover, any methods disclosed and claimed herein are particularly directed to the control and operation of the systems described and claimed herein, wherein such methods are not particularly directed to methods of surgery on humans, but instead to operation of the robot system and/or procedure tool and end effector in relation to the training procedures previously indicated.

Moreover, while aspects of the disclosure illustrate example procedures involving maxillofacial/dental anatomy, one skilled in the art will appreciate that the concept of the robot system and methods disclosed herein may find applicability to other surgical processes not involving dental surgery, such as, for example, orthopedic surgery, ENT surgery, and neurosurgery. As such, the aspects of the disclosure presented herein are merely examples of the applicability of the disclosed concepts and are not intended to be limiting in any manner. That is, aspects of the robot system disclosed herein may be otherwise applicable to various parts of the patient to facilitate other types of surgery, besides dental surgery.

Figure 2:
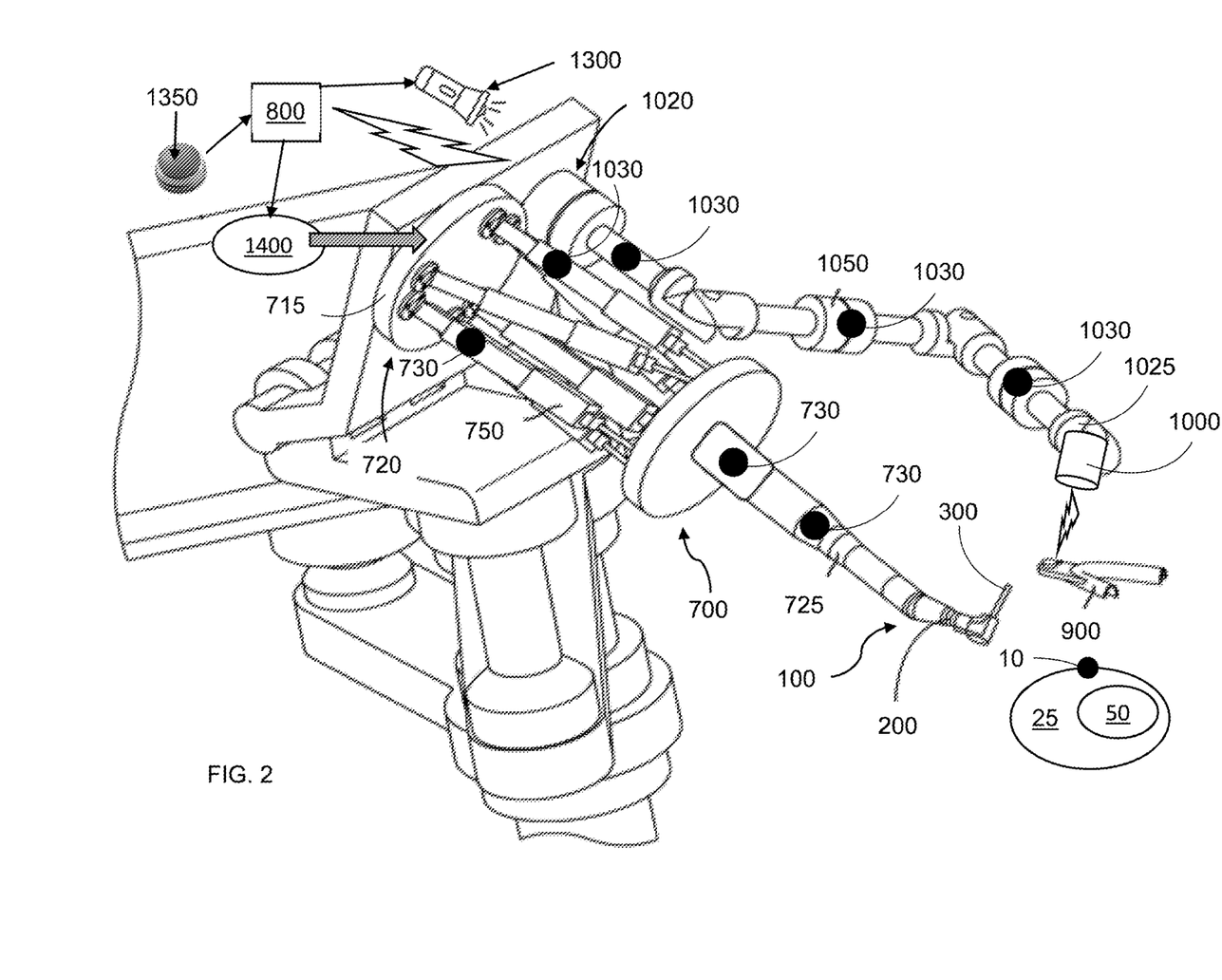

In some aspects, as shown for example in FIGS. 1 and 2, the procedure tool 200 is a drilling device and the end effector 300 is a drill bit or an abrading bit. In other aspects, the procedure tool 200 is an ultrasonic cleaner and the end effector 300 is a cleaning tip. In yet other aspects, the procedure tool 200 is a pneumatic polisher and the end effector 300 is a polishing tip. The procedure tool 200 is engaged with the distal end 725 of an articulating robot arm 750 of the robot system 100, and the end effector 300 of the procedure tool 200 is adapted to interact with the site 25 and/or the object 50 received at the site.

Figure 3:
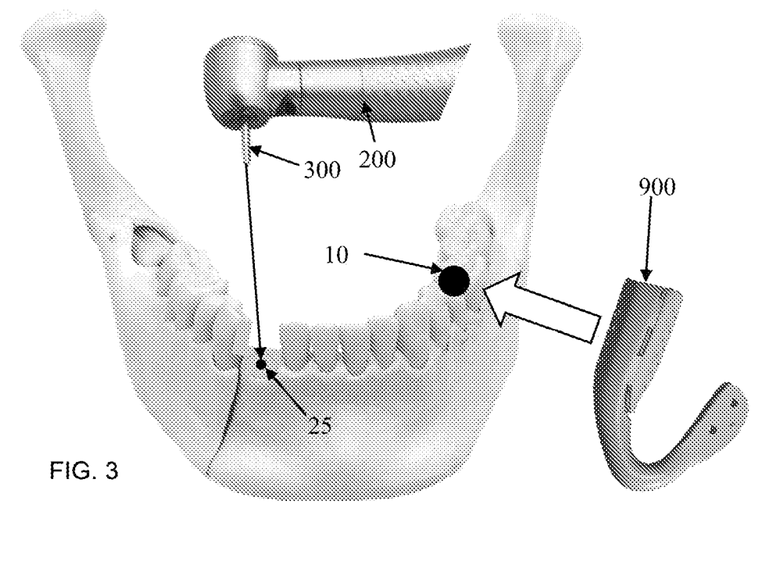
FIG. 3 schematically illustrates an example interaction between a robot system as shown in FIGS. 1 and 2 and a site/object.

A controller 800, which can comprise or include a special purpose computer, and includes at least a processor and a memory, is arranged in communication with the articulating robot arm 750, the procedure tool 200, and a fiducial marker 900 (see, e.g., FIG. 3). The fiducial marker 900 is adapted to engage a reference location 10 at or adjacent to the site 25 or the object 50. The controller 800 is arranged, for example, to determine a disposition of the end effector 300 in relation to the fiducial marker 900 during movement of the end effector 300 to interact with the site 25 or the object 50. The controller 800 is further arranged to direct the articulating robot arm 750 to physically control or regulate allowable movement of the procedure tool 200, directly relative to the disposition of the end effector 300, with respect to the fiducial marker 900 engaged with the reference location 10, so as to, for instance, account and adapt for movement of the site 25 or the object 50 during the robot procedure. For example, in some aspects, the controller 800 is implemented to develop a plan, procedure, or operation which includes the procedure tool 200/end effector 300 being directed to traverse a route into proximity (i.e., to a staging position) to the site 25 or the object 50, and away from the staging position/the site 25 or the object 50, as well as the subsequent route along which the procedure tool 200/end effector 300 is manipulated into interaction with the site 25 or the object 50, with the end effector 300 (and in an established trajectory, in some instances) to perform the plan/procedure/operation.

According to aspects of the present disclosure, the developed plan/procedure/operation details movement, including trajectory, of the procedure tool 200/end effector 300 along a route to the staging positon, and toward and into engagement with the site 25 or the object 50, while the articulating robot arm 750 (having the procedure tool 200 attached to the distal end 725 thereof) includes structure and regulatory functionality to allow the procedure tool 200 to be manually moved along the allowable pathway or route according to the plan/procedure/operation. However, by way of the articulating robot arm 750, manual movement of the procedure tool 200 outside the allowable pathway or route is restricted, impeded, or otherwise prevented.

In some aspects (see, e.g., FIG. 1), the distal end 1025 of a tracking arm 1050 is physically engaged with the fiducial marker 900. The tracking arm 1050 is a separate and discrete element from the articulating robot arm 750. Further, the tracking arm 1050, in communication with the controller 800, is thus arranged to cooperate with the controller 800 for the controller 800 to determine the spatial relationship between the fiducial marker 900/reference location 10 and the end effector 300 (i.e., via the articulating robot arm 750 and the tracking arm 1050)). In other aspects (see, e.g., FIG.

2), the robot system 100 includes a detector 1000 engaged with a distal end 1025 of a tracking arm 1050, wherein the tracking arm 1050 is a separate and discrete element from the articulating robot arm 750). The tracking arm 1050 and the detector 1000 are arranged in communication with the controller 800. The detector 1000 is further arranged to cooperate with the tracking arm 1050 for the tracking arm 1050) to position the detector 1000 in a spaced-apart relationship with the fiducial marker 900 engaged with the reference location 10, to detect the fiducial marker 900 and to cooperate with the controller 800 to determine a spatial relationship between the fiducial marker 900/reference location 10) and the end effector 300 (via the articulating robot arm 750) and the tracking arm 1050). The detector 1000, in particular example aspects, is an electrical detector, an electromechanical detector, an electromagnetic detector, an optical detector, an infrared detector, or combinations thereof.

In some aspects, the articulating robot arm 750) has a proximal end 720 and opposed to the distal end 725. One or more sensors 730 is operably engaged with the articulating robot arm 750) and arranged to sense position data associated with the articulating robot arm 750. For example, the one or more sensors 730 is engaged with one of a plurality of arm members of the articulating robot arm 750 and/or with a joint engaged between arm members, or between arm members and other components of the articulating robot arm 750) (e.g., between the proximal end 720 of the articulating robot arm 750) and a base member 715). In this manner, the position data sensed by the one or more sensors 730 includes, for example, the spatial relationship (e.g., orientation, position, etc.) of the articulating robot arm 750 and/or the components thereof in a three dimensional space. In some instances, the spatial relationship is determined relative to the base member 715 to which the proximal end 720) of the articulating robot arm 750 is mounted. As such, in some aspects, the one or more sensors 730 is engaged with the articulating robot arm 750 such that the position data sensed by the one or more sensors 730 at least indicates the spatial position of at least the distal end 725 of the articulating robot arm 750 in a three dimensional space, and in some instances relative to the base member 715/proximal end 720 of the articulating robot arm 750. The position of the procedure tool 200/end effector 300, in the three-dimensional space, are related to, known or determined from, or otherwise associated with the position of the distal end 725 of the articulating robot arm 750 determined from the position data of the one or more sensors 730, and the engagement of the procedure tool 200 with the distal end 725 of the articulating robot arm 750. As such, the location of the distal end of the end effector 300, relative to the proximal end 720 of the robot arm 750, is determined from position data from the one or more position sensors 730.

In some aspects, the tracking arm 1050 has a proximal end 1020 and opposed to the distal end 1025. One or more sensors 1030 is operably engaged with the tracking arm 1050 and arranged to sense position data associated with the tracking arm 1050. For example, the one or more sensors 1030 is engaged with one of a plurality of arm members of the tracking arm 1050 and/or with a joint engaged between arm members, or between arm members and other components of the tracking arm 1050 (e.g., between the proximal end 1020 of the tracking arm 1050 and the base member 715). In this manner, the position data sensed by the one or more sensors 1030 includes, for example, the spatial relationship (e.g., orientation, position, etc.) of the tracking arm 1050 and/or the components thereof in a three dimensional space. In some instances, the spatial relationship is determined relative to the base member 715 to which the proximal end 1020 of the tracking arm 1050 is mounted. As such, in some aspects, the one or more sensors 1030 is engaged with the tracking arm 1050 such that the position data sensed by the one or more sensors 1030 at least indicates the spatial position of at least the distal end 1025 of the tracking arm 750 in a three dimensional space, and in some instances relative to the base member 715/proximal end 1020 of the tracking arm 1050. The position of the reference location 10, in the three-dimensional space, is related to, known or determined from, or otherwise associated with the position of the distal end 1025 of the tracking arm 1050 determined from the position data of the one or more sensors 1030, and the physical engagement between the fiducial marker 900/reference location 10 and the distal end 1025 of the tracking arm 1050, or the detection of the fiducial marker 900/reference location 10 by the detector 1000 engaged with the distal end 1025 of the tracking arm 1050. That is, the location of the distal end 1025 of the tracking arm 1050, relative to the proximal end 1020 thereof, is determined from position data from the one or more position sensors 1030.

As such, according to some aspects, the robot system 100 comprises the tracking arm 1050 having the distal end 1025 arranged in communication with the reference location 10 at or adjacent to the site 25 or the object 50 received at the site 25. The reference location 10 is disposed in a relation to the proximal end 1020 of the tracking arm 1050 in the three-dimensional space. The robot arm 750 has the procedure tool 200 engaged with the distal end 725 thereof, wherein the procedure tool 200 has the end effector 300 engaged therewith, and wherein the distal end of the end effector 300 is adapted to interact with the site 25 or the object 50. The proximal end 720 of the robot arm 750 is disposed in a known relation to the proximal end 1020 of the tracking arm 1050.

The controller 800 is arranged in operable communication with the tracking arm 1050, the robot arm 750, and the procedure tool 200, wherein the controller 800 is arranged to determine an actual spatial relation between the procedure tool 200 and the reference location 10 in the three-dimensional space via the robot arm 750 and the tracking arm 1050, and wherein the actual spatial relation includes the location of the distal end of the end effector 300 of the procedure tool 200, in relation to the reference location 10. The controller 800 is further arranged to direct the procedure tool 200 to a staging position adjacent to the site 25 or the object 50 by regulating movement of the robot arm 750 according to the operational plan and based on the actual spatial relation, wherein the operational plan includes the route traversed by the end effector 300 to and from the site 25 or the object 50 and during the procedure performed by the end effector 300 at the site 25 or on the object 50.

In particular aspects of the present disclosure, an actuator 1350 is disposed in spaced-apart relation to the procedure tool 200, and is arranged in communication with the controller 800. The actuator 1350 is further arranged to actuate the controller 800 for the controller 800 to direct the robot arm 750 to autonomously move the procedure tool 200 from the staging position and according to the operational plan, for the end effector 300 to interact with the site 25 or the object 50, and for the procedure tool 200 to perform the procedure at the site 25 or on the object 50 using the end effector 300, relative to the reference location 10. That is, upon actuation of an autonomous mode by actuation of the actuator 1350, with the procedure tool 200 disposed at the staging position with respect to the site 25/object 50, the controller 800 is prompted to direct the robot arm 750 to autonomously move the procedure tool 200 (i.e., moved by the structure of the robot arm 750 in response to the controller 800, without manual manipulation of the procedure tool 200 or the robot arm 750) according to the operational plan, for the end effector 300 to interact with the site 25 or the object 50, and for the procedure tool 200 to perform the procedure at the site 25 or on the object 50 using the end effector 300. In some instances, an actuation indicia 1300 (see, e.g., FIGS. 1, 2, and 4-6) is operably engaged with the controller 800 and arranged to provide, for example, a visual indicia, an aural indicia or other appropriate alert upon the procedure tool 200 being placed in the staging position, upon the actuator 1350 being actuated, and/or in other situations in which an alert is appropriate, necessary, and/or desired.

According to such aspects of the present disclosure, the actuator 1350 is separated from the vicinity of the interaction between the end effector 300 and the site 25/object 50 likewise allows the user/operator to be separated from that vicinity as the procedure is being conducted, and therefore limiting or eliminating exposure of the dental professional to aerosols and particulate debris resulting from the procedure. That is, such a robot system 100 allows the user/operator to conduct the procedure in a user-friendly, distanced, and ergonomic manner, without limiting the mobility of the procedure tool or the accessibility of the procedure tool/end effector to the site 25/object 50.

Figure 4:
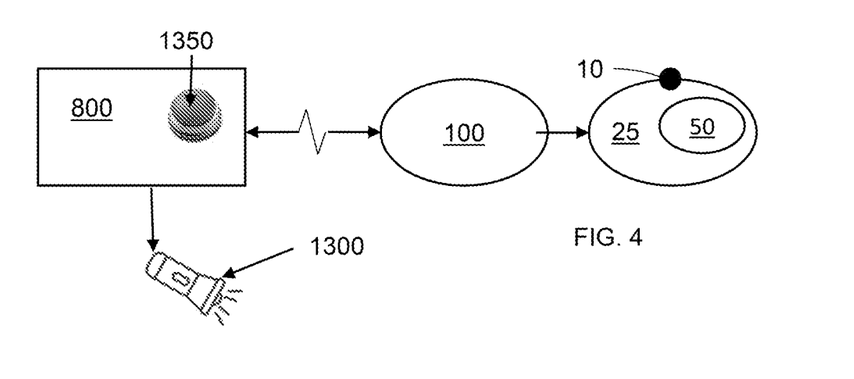
FIGS. 4-6 schematically illustrate alternate arrangements of a remote actuator for actuating an autonomous mode of a robot system as shown in FIGS. 1 and 2, according to aspects of the present disclosure.
Figure 5:
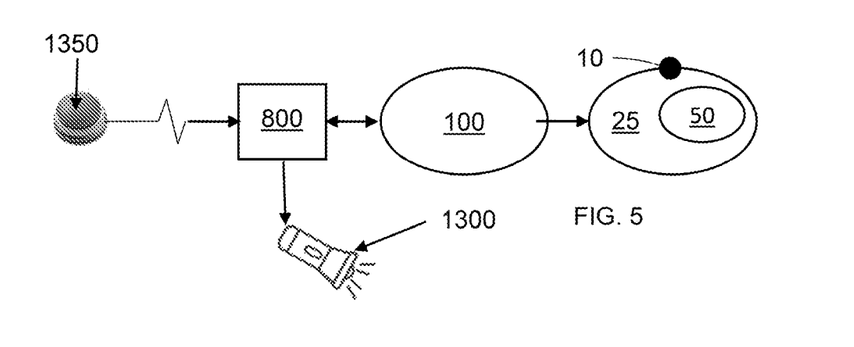
Figure 6:
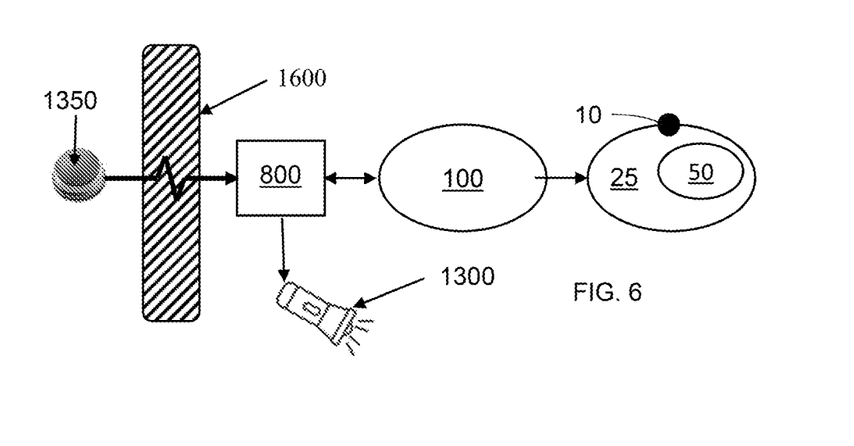

In particular aspects, as shown, for example in FIG. 4, the controller 800 is spaced-apart from the procedure tool 200/end effector 300, and the controller 800 includes the actuator 1350 engaged therewith or incorporated therein. For example, the controller 800 having the actuator 1350 can be disposed separately and/or away from the robot arm 750/tracking arm 1050. In other aspects, as shown for example in FIG. 5, the actuator 1350 is discrete and separate from the controller 800. That is, the controller 800 can be, but does not have to be, disposed separately and discretely from the robot system 100, but the actuator 1350 itself is separate and discrete from the controller 800, which still allows the autonomous mode to be actuated at a distance from the vicinity of the interaction between the end effector 300 and the site 25/object 50. In still other aspects, as shown for example in FIG. 6, the actuator 1350 is separated from the procedure tool 200 by a barrier 1600 therebetween.

In some aspects, the controller 800 is arranged to direct the robot arm 750 to autonomously move the procedure tool 200 back to the staging position or to a retracted position spaced-apart from the site 25 or the object 50, upon on completion of the procedure on the site 25 or the object 50. In other aspects, the autonomous removal may be actuated in response to the actuator 1350 actuating the controller 800 to retract the procedure tool 200 to the retracted position.

In other aspects, since the controller 800 remains in communication with both the reference location 10 and the procedure tool 200/end effector 300 during the procedure, the controller 800 is arranged to change the actual spatial relation between the procedure tool 200 and the reference location 10, relative to movement of the reference location 10, with the procedure tool 200 in the staging position. That is, the position of the reference location 10 is monitored during the procedure, and the plan and/or procedure executed by the robot system 100 is updated to account and adapt for any movement of the reference location 10 during the procedure, and the planned route of the procedure tool 200/end effector 300 adjusted accordingly. Particularly, the controller 800 is arranged to change the actual spatial relation between the procedure tool 200 and the reference location 10, relative to movement of the reference location 10, upon the robot arm 750 being directed by the controller 800 to autonomously move the procedure tool 200 from the staging position (e.g., in the autonomous mode), according to the operational plan, for the end effector 300 to interact with the site 25 or the object 50 or for the procedure tool 200 to perform the procedure at the site 25 or on the object 50 using the end effector 300.

In some aspects, a drive unit 1400 is arranged in communication with the controller 800, and operably engaged with the robot arm 750, operably engaged between the robot arm 750 and the procedure tool 200, and/or operably engaged with the procedure tool 200. In such aspects, the drive unit 1400 is responsive to actuation of the actuator 1350, via the controller 800, to cooperate with the robot arm 750 to autonomously move the procedure tool 200 from the staging position, according to the operational plan, for the end effector 300 to interact with the site 25 or the object 50 and for the procedure tool 200 to perform the procedure at the site 25 or on the object 50 using the end effector 300. That is, controller 800 cooperates with the drive unit 1400 to drive the robot arm 750 in the autonomous mode.

Figure 7:
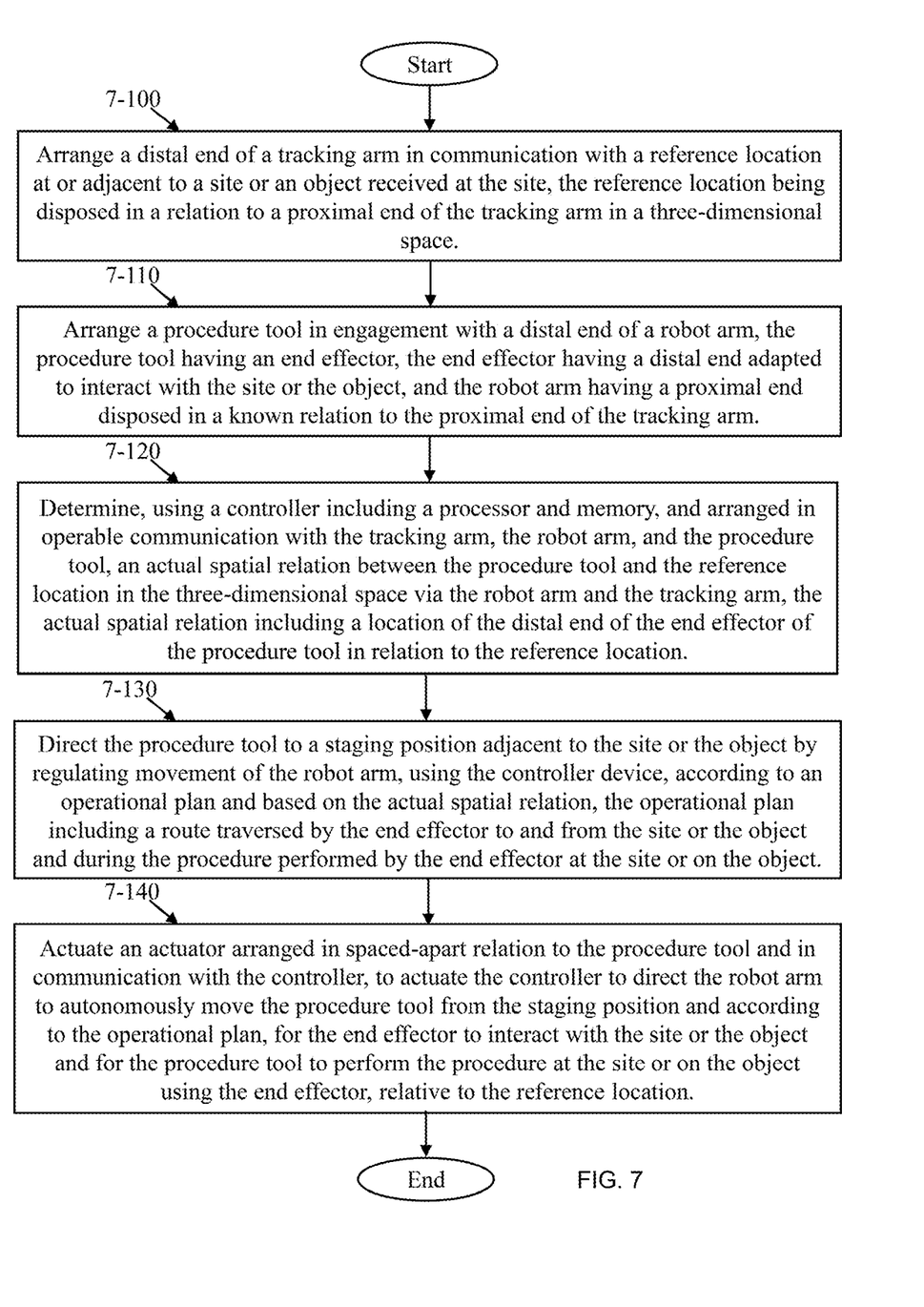
FIG. 7 schematically illustrates a method of operating a robot system as shown in FIGS. 1 and 2, according to one aspect of the present disclosure.

As shown, for example, in FIG. 7, another aspect of the present disclosure provides a method of operating the robot system 100. Such a method comprises arranging the distal end 1025 of the tracking arm 1050 in communication with the reference location 10 at or adjacent to the site 25 or the object 50 received at the site 25, wherein the reference location 10 is disposed in a relation to the proximal end 1020 of the tracking arm 1050 in the three-dimensional space (Block 7-100). The procedure tool 200 having the end effector 300 engaged therewith is arranged in engagement with the distal end 725 of the robot arm 750, wherein the distal end of the end effector 300 is adapted to interact with the site 25 or the object 50, and wherein the proximal end 720 of the robot arm 750 is disposed in a known relation to the proximal end 1020 of the tracking arm 1050) (Block 7-110). Using the controller 800 (including a processor and memory, and being arranged in operable communication with the tracking arm 1050, the robot arm 750, and the procedure tool 200), an actual spatial relation is determined between the procedure tool 200 and the reference location 10) in the three-dimensional space via the robot arm 750 and the tracking arm 1050, wherein the actual spatial relation includes the location of the distal end of the end effector 300 of the procedure tool 200 in relation to the reference location 10 (Block 7-120)).

The procedure tool 200 is directed to a staging position adjacent to the site 25 or the object 50 by regulating movement of the robot arm 750, using the controller device 800, according to an operational plan and based on the actual spatial relation, wherein the operational plan including a route traversed by the end effector 300 to and from the site 25 or the object 50 and during the procedure performed by the end effector 300 at the site 25 or on the object 50) (Block 7-130)). An actuator 1350) is actuated, wherein the actuator 1350) is arranged in spaced-apart relation to the procedure tool 200 and in communication with the controller 800, to actuate the controller 800 to direct the robot arm 750 to autonomously move the procedure tool 200 from the staging position and according to the operational plan, for the end effector 300 to interact with the site 25 or the object 50 and for the procedure tool 200 to perform the procedure at the site 25 or on the object 50 using the end effector 300, relative to the reference location 10) (Block 7-140)).

Figure 8:
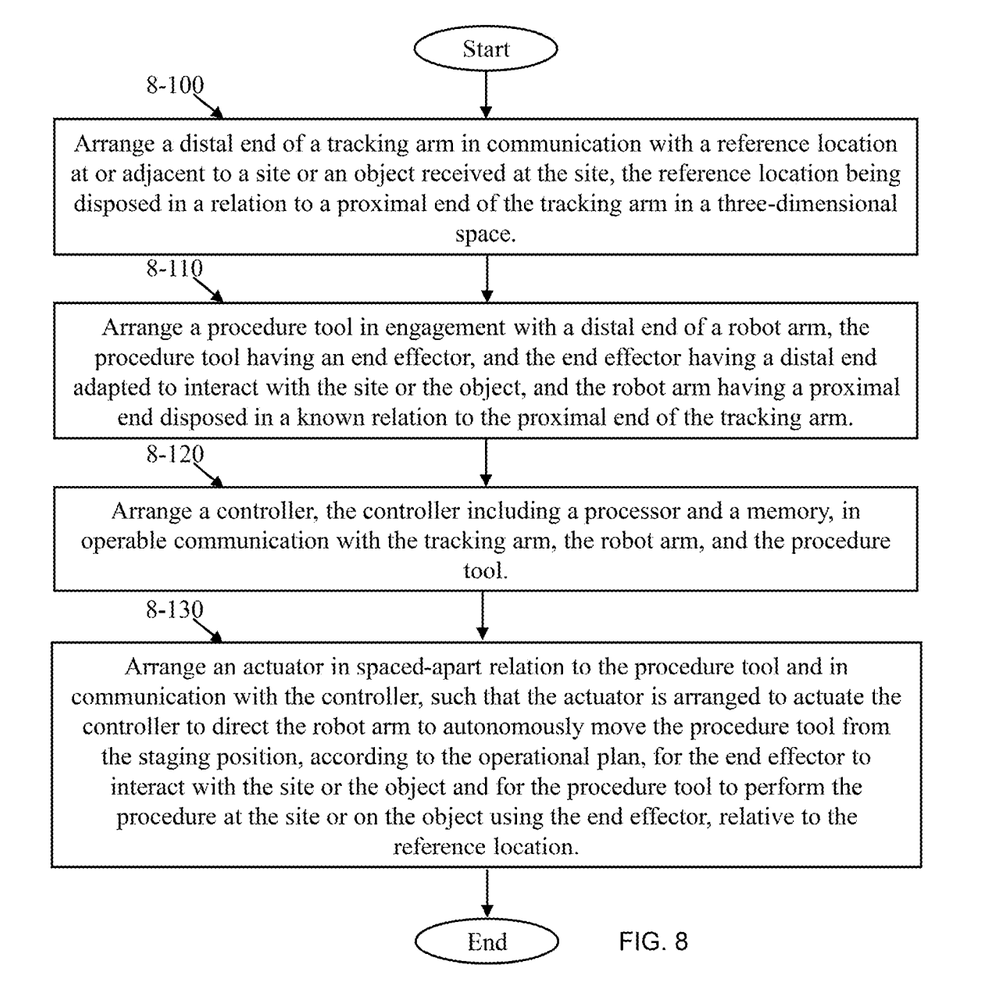
FIG. 8 schematically illustrates a method of forming a robot system as shown in FIGS. 1 and 2, according to another aspect of the present disclosure.

As shown, for example, in FIG. 8, another aspect of the present disclosure provides a method of forming the robot system 100, wherein such a method comprises arranging a robot arm 750 such that a proximal end 720 thereof is disposed in a known relation with a proximal end 1020 of a tracking arm 1050, wherein the tracking arm 1050 has a distal end 1025 adapted to be in communication with a reference location 10 at or adjacent to a site 25 or an object 50 received at the site 25, with the reference location 10) being disposed in a relation to a proximal end 1020 of the tracking arm 1050 in a three-dimensional space (Block 8-100)). The procedure tool 200 is engaged with a distal end 725 of the robot arm 750, wherein the procedure tool 200 has an end effector 300 engaged therewith, with the end effector 300 having a distal end adapted to interact with the site 25 or the object 50 (Block 8-110)).

The controller 800) (including a processor and a memory) is arranged in operable communication with the tracking arm 1050, the robot arm 750, and the procedure tool 200 (Block 8-120), wherein the controller 800 is arranged to determine an actual spatial relation between the procedure tool 200 and the reference location 10 in the three-dimensional space via the robot arm 750 and the tracking arm 1050, with the actual spatial relation including a location of the distal end of the end effector 300 of the procedure tool 200 in relation to the reference location 10. The controller 800 is further arranged to direct the procedure tool 200 to a staging position adjacent to the site 25 or the object 50 by regulating movement of the robot arm 750 according to an operational plan and based on the actual spatial relation, wherein the operational plan including a route traversed by the end effector 300 to and from the site 25 or the object 50 and during the procedure performed by the end effector 300 at the site 25 or on the object 50. The actuator 1350 is arranged in spaced-apart relation to the procedure tool 200 and in communication with the controller 800, such that the actuator 1350 is arranged to actuate the controller 800 to direct the robot arm 750 to autonomously move the procedure tool 200 from the staging position, according to the operational plan, for the end effector 300 to interact with the site 25 or the object 50 and for the procedure tool 200 to perform the procedure at the site 25 or on the object 50 using the end effector 300, relative to the reference location 10 (Block 8-130).

Many modifications and other embodiments of the inventions set forth herein will come to mind to one skilled in the art to which these disclosed embodiments pertain having the benefit of the teachings presented in the foregoing descriptions and the associated drawings. Therefore, it is to be understood that embodiments of the invention are not to be limited to the specific embodiments disclosed and that modifications and other embodiments are intended to be included within the scope of the invention. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the disclosure. In this regard, for example, different combinations of elements and/or functions than those explicitly described above are also contemplated within the scope of the disclosure. Although specific terms are employed herein, they are used in a generic and descriptive sense only and not for purposes of limitation.

It should be understood that although the terms first, second, etc. may be used herein to describe various steps or calculations, these steps or calculations should not be limited by these terms. These terms are only used to distinguish one operation or calculation from another. For example, a first calculation may be termed a second calculation, and, similarly, a second step may be termed a first step, without departing from the scope of this disclosure. As used herein, the term "and/or" and the "/" symbol includes any and all combinations of one or more of the associated listed items.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

That which is claimed:

1. A robot system, comprising:
   a tracking arm having a distal end arranged in communication with a reference location at or adjacent to a site or an object received at the site, the reference location being disposed in a relation to a proximal end of the tracking arm in a three-dimensional space;
   a robot arm having a procedure tool engaged with a distal end thereof, the procedure tool having an end effector engaged therewith, the end effector having a distal end adapted to interact with the site or the object, the robot arm having a proximal end disposed in a known relation to the proximal end of the tracking arm;
   a controller including a processor and memory, the controller being arranged in operable communication with the tracking arm, the robot arm, and the procedure tool, the controller being arranged to:
      determine an actual spatial relation between the procedure tool and the reference location in the three-dimensional space via the robot arm and the tracking arm, the actual spatial relation including a location of the distal end of the end effector of the procedure tool in relation to the reference location; and
      direct the procedure tool to a staging position adjacent to the site or the object by regulating movement of the robot arm according to an operational plan and based on the actual spatial relation, the operational plan including a route traversed by the end effector to and from the site or the object and during the procedure performed by the end effector at the site or on the object; and
   an actuator disposed in spaced-apart relation to the procedure tool and arranged in communication with the controller, the actuator being arranged to actuate the controller to direct the robot arm to autonomously move the procedure tool from the staging position and according to the operational plan, for the end effector to interact with the site or the object and for the procedure tool to perform the procedure at the site or on the object using the end effector, relative to the reference location.

2. The system of claim 1, wherein the controller is spaced-apart from the procedure tool and the controller includes the actuator.

3. The system of claim 1, wherein the actuator is discrete and separate from the controller.

4. The system of claim 1, wherein the actuator is separated from the procedure tool by a barrier therebetween.

5. The system of claim 1, wherein the controller is arranged to direct the robot arm to autonomously move the procedure tool back to the staging position or to a retracted position spaced-apart from the site or the object, on completion of the procedure on the site or the object or in response to the actuator actuating the controller to retract the procedure tool to the retracted position.

6. The system of claim 1, wherein the controller is arranged to change the actual spatial relation between the procedure tool and the reference location, relative to movement of the reference location, with the procedure tool in the staging position.

7. The system of claim 1, wherein the controller is arranged to change the actual spatial relation between the procedure tool and the reference location, relative to movement of the reference location, upon the robot arm being directed by the controller to autonomously move the procedure tool from the staging position, according to the operational plan, for the end effector to interact with the site or the object or for the procedure tool to perform the procedure at the site or on the object using the end effector.

8. The system of claim 1, comprising a drive unit in communication with the controller, and operably engaged with the robot arm, operably engaged between the robot arm and the procedure tool, or operably engaged with the procedure tool, the drive unit being responsive to actuation of the actuator, via the controller, to cooperate with the robot arm to autonomously move the procedure tool from the staging position, according to the operational plan, for the end effector to interact with the site or the object and for the procedure tool to perform the procedure at the site or on the object using the end effector.

9. The system of claim 1, wherein the robot arm comprises a plurality of interconnected arm segments having one or more position sensors engaged therewith, and wherein the controller is arranged to determine the location of the distal end of the end effector of the procedure tool, in relation to the proximal end of the robot arm, from position data from the one or more position sensors.

10. The system of claim 1, wherein the tracking arm comprises a plurality of interconnected arm segments having one or more position sensors engaged therewith, and wherein the controller is arranged to determine a location of the distal end of the tracking arm, relative to the proximal end thereof, from position data from the one or more position sensors.

11. A method of operating a robot system, the method comprising:
arranging a distal end of a tracking arm in communication with a reference location at or adjacent to a site or an object received at the site, the reference location being disposed in a relation to a proximal end of the tracking arm in a three-dimensional space;
arranging a procedure tool in engagement with a distal end of a robot arm, the procedure tool having an end effector engaged therewith, the end effector having a distal end adapted to interact with the site or the object, and the robot arm having a proximal end disposed in a known relation to the proximal end of the tracking arm;
determining, using a controller including a processor and memory, and arranged in operable communication with the tracking arm, the robot arm, and the procedure tool, an actual spatial relation between the procedure tool and the reference location in the three-dimensional space via the robot arm and the tracking arm, the actual spatial relation including a location of the distal end of the end effector of the procedure tool in relation to the reference location;
directing the procedure tool to a staging position adjacent to the site or the object by regulating movement of the robot arm, using the controller device, according to an operational plan and based on the actual spatial relation, the operational plan including a route traversed by the end effector to and from the site or the object and during the procedure performed by the end effector at the site or on the object; and
actuating an actuator arranged in spaced-apart relation to the procedure tool and in communication with the controller, to actuate the controller to direct the robot arm to autonomously move the procedure tool from the staging position and according to the operational plan, for the end effector to interact with the site or the object and for the procedure tool to perform the procedure at the site or on the object using the end effector, relative to the reference location.

12. The method of claim 11, wherein actuating the actuator comprises actuating the actuator included in the controller, with the controller being spaced-apart from the procedure tool.

13. The method of claim 11, wherein actuating the actuator comprises actuating the actuator with the actuator being discrete and separate from the controller.

14. The method of claim 11, wherein actuating the actuator comprises actuating the actuator with the actuator being separated from the procedure tool by a barrier therebetween.

15. The method of claim 11, comprising directing, by the controller, the robot arm to autonomously move the procedure tool back to the staging position or to a retracted position spaced-apart from the site or the object, on completion of the procedure on the site or the object or in response to the actuator actuating the controller to retract the procedure tool to the retracted position.

16. The method of claim 11, comprising changing, by the controller, the actual spatial relation between the procedure tool and the reference location, relative to movement of the reference location, with the procedure tool in the staging position.

17. The method of claim 11, comprising changing, by the controller, the actual spatial relation between the procedure tool and the reference location, relative to movement of the reference location, upon the robot arm being directed by the controller to autonomously move the procedure tool from the staging position, according to the operational plan, for the end effector to interact with the site or the object or for the procedure tool to perform the procedure at the site or on the object using the end effector.

18. The method of claim 11, wherein actuating the actuator comprises actuating the actuator to actuate a drive unit, the drive unit being in communication with the controller, and operably engaged with the robot arm, operably engaged between the robot arm and the procedure tool, or operably engaged with the procedure tool, the drive unit being responsive to actuation of the actuator, via the controller, to cooperate with the robot arm to autonomously move the instrument from the staging position, according to the operational plan, for the end effector to interact with the site or the object and for the procedure tool to perform the procedure at the site or on the object using the end effector.

19. The method of claim 11, wherein the robot arm comprises a plurality of interconnected arm segments having one or more position sensors engaged therewith, and wherein determining the actual spatial relation comprises determining, using the controller, the location of the distal end of the end effector of the procedure tool, in relation to the proximal end of the robot arm, from position data from the one or more position sensors.

20. The method of claim 11, wherein the tracking arm comprises a plurality of interconnected arm segments having one or more position sensors engaged therewith, and wherein determining the actual spatial relation comprises determining, using the controller, a location of the distal end of the tracking arm, relative to the proximal end thereof, from position data from the one or more position sensors.

21. A method of forming a robot system, comprising:
arranging a robot arm such that a proximal end thereof is disposed in a known relation with a proximal end of a tracking arm, the tracking arm having a distal end adapted to be in communication with a reference location at or adjacent to a site or an object received at the site, with the reference location being disposed in a relation to a proximal end of the tracking arm in a three-dimensional space;
engaging a procedure tool with a distal end of the robot arm, the procedure tool having an end effector engaged therewith, the end effector having a distal end adapted to interact with the site or the object;
arranging a controller, the controller including a processor and a memory, in operable communication with the tracking arm, the robot arm, and the procedure tool, the controller being arranged to:
determine an actual spatial relation between the procedure tool and the reference location in the three-dimensional space via the robot arm and the tracking arm, the actual spatial relation including a location of the distal end of the end effector of the procedure tool in relation to the reference location; and
direct the procedure tool to a staging position adjacent to the site or the object by regulating movement of the robot arm according to an operational plan and based on the actual spatial relation, the operational plan including a route traversed by the end effector to and from the site or the object and during the procedure performed by the end effector at the site or on the object; and
arranging an actuator in spaced-apart relation to the procedure tool and in communication with the controller, such that the actuator is arranged to actuate the controller to direct the robot arm to autonomously move the procedure tool from the staging position, according to the operational plan, for the end effector to interact with the site or the object and for the procedure tool to perform the procedure at the site or on the object using the end effector, relative to the reference location.

22. The method of claim 21, wherein arranging the actuator comprises arranging the actuator to be included in the controller, and arranging the controller to be spaced-apart from the procedure tool.

23. The method of claim 21, wherein arranging the actuator comprises arranging the actuator such that the actuator is discrete and separate from the controller.

24. The method of claim 21, wherein arranging the actuator comprises arranging the actuator such that the actuator is separated from the procedure tool by a barrier therebetween.

25. The method of claim 21, wherein arranging the controller comprises arranging the controller to direct the robot arm to autonomously move the procedure tool back to the staging position or to a retracted position spaced-apart from the site or the object, on completion of the procedure on the site or the object or in response to the actuator actuating the controller to retract the procedure tool to the retracted position.

26. The method of claim 21, wherein arranging the controller comprises arranging the controller to change the actual spatial relation between the procedure tool and the reference location, relative to movement of the reference location, with the procedure tool in the staging position.

27. The method of claim 21, wherein arranging the controller comprises arranging the controller to change the actual spatial relation between the procedure tool and the reference location, relative to movement of the reference location, upon the robot arm being directed by the controller to autonomously move the procedure tool from the staging position, according to the operational plan, for the end effector to interact with the site or the object or for the procedure tool to perform the procedure at the site or on the object using the end effector.

28. The method of claim 21, wherein arranging the actuator comprises arranging the actuator to actuate a drive unit, the drive unit being in communication with the controller, and operably engaged with the robot arm, operably engaged between the robot arm and the procedure tool, or operably engaged with the procedure tool, the drive unit being arranged to be responsive to actuation of the actuator, via the controller, to cooperate with the robot arm to autonomously move the instrument from the staging position, according to the operational plan, for the end effector to interact with the site or the object and for the procedure tool to perform the procedure at the site or on the object using the end effector.

29. The method of claim 21, wherein the robot arm comprises a plurality of interconnected arm segments having one or more position sensors engaged therewith, and wherein arranging the controller comprises arranging the controller to determine the location of the distal end of the end effector of the procedure tool, in relation to the proximal end of the robot arm, from position data from the one or more position sensors.

30. The method of claim 21, wherein the tracking arm comprises a plurality of interconnected arm segments having one or more position sensors engaged therewith, and wherein arranging the controller comprises arranging the controller to determine a location of the distal end of the tracking arm, relative to the proximal end thereof, from position data from the one or more position sensors.

* * * * *